3,460,406
**AUTOMATIC CHANGE SPEED GEAR ARRANGE-
MENT FOR MOTOR VEHICLES**
Siegfried Strohm and Erwin Pfisterer, Stuttgart-Stamm-
heim, Germany, assignors to Firma Porsche KG, Stutt-
gart-Zuffenhausen, Germany
Filed July 25, 1967, Ser. No. 655,891
Claims priority, application Germany, Aug. 2, 1966,
P 40,113
Int. Cl. B60k 19/16, 33/00
U.S. Cl. 74—866                                        8 Claims

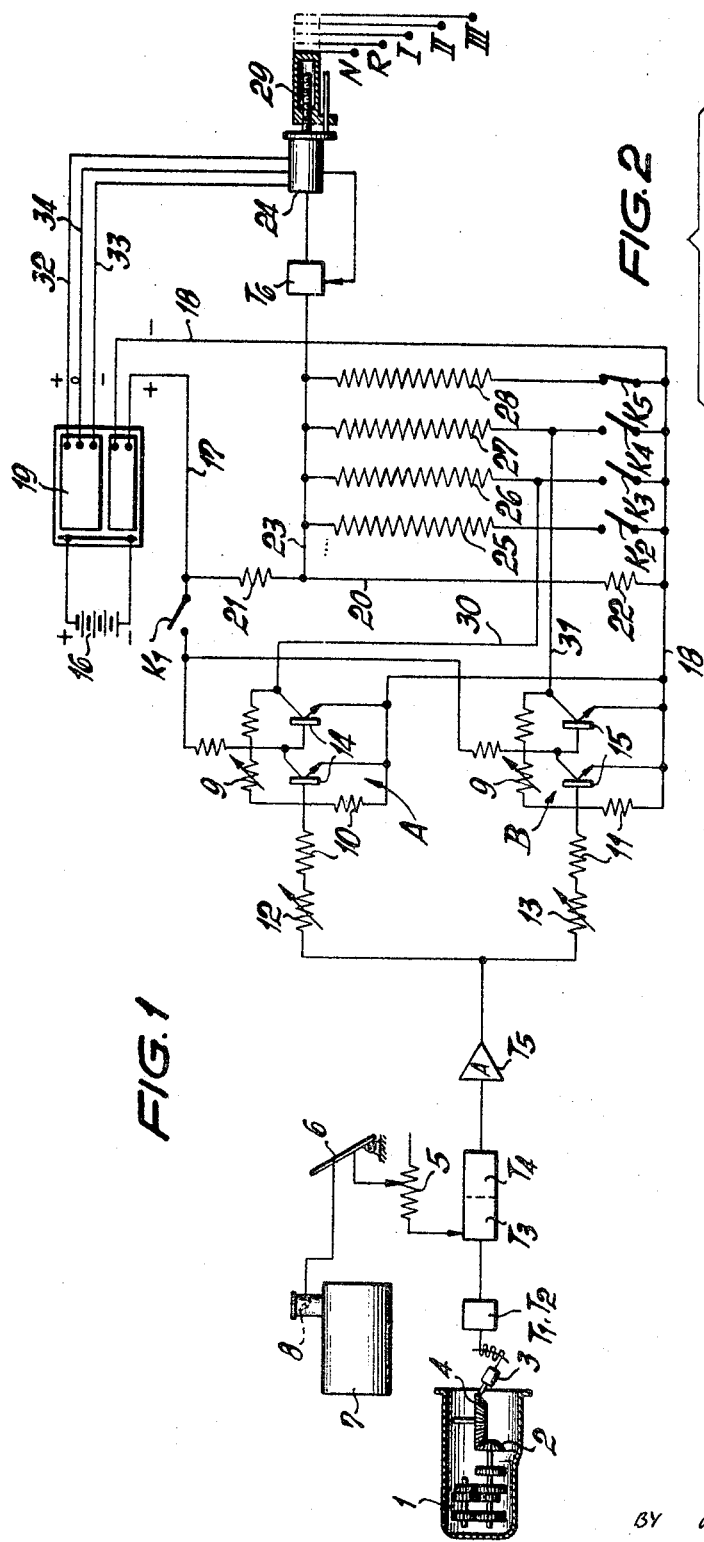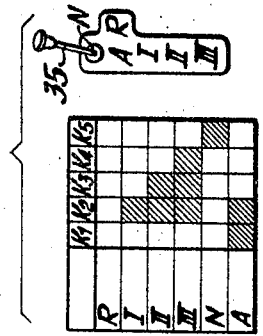

ABSTRACT OF THE DISCLOSURE

A change speed gear arrangement for vehicles, particularly passenger motor vehicles, having an automatic electrical circuit for providing electrical shifting signals in dependence upon the vehicle speed and the engine load, wherein the electrical signal actuates a reversible motor for moving the mechanical gear changer. The automatic operation is manually overridable. The integrated speed and load signal is fed by a plurality of trigger devices, designed to fire at different ratio changes, respectively, to a bank of parallel resistances for providing control voltages to the reversible motor; the reversible motor having a feedback circuit for neutralizing the control voltage in dependence upon the rotational distance.

Background of the invention

With known shifting arrangements of this type, only one transistor circuit is provided for speed change to higher and lower gears, respectively, which is controlled by the control voltage of a common alternating generator. The actual shifting is accomplished by means of transistor controlled motor relays acting through additional relays and resistance combinations for operating a servomotor and its shifting drum operatively controlling movement of the shift members. The main purpose of the transistor control circuits is to avoid high transmitter current intensities at the entrance side so that a small transmitter generator may be used. With such an arrangement, manual shifting operation is not possible.

Summary of the invention

In contrast to the prior art, the present invention provides a shifting arrangement for change speed gear transmissions of motor vehicles wherein the shifting may be either automatic or manual. The present invention does not employ expensive signal generators and control relays in the circuit, which are particularly sensitive to oscillations and will not operate over a long period of time in vehicle use.

Means are provided that produce an integrated vehicle speed and engine output or load signal that is fed to a plurality of trigger steps for placing into circuit selected ones of a plurality of parallelly arranged resistors to provide a control voltage for the servomotor. A balancing resistance is provided in a feedback circuit for controlling the movement of the servomotor and for allowing manual overriding operation. The difference between the shifting points in down-shifting and up-shifting for one of the trigger steps may be conveniently and economically adjusted by means of a trimming potentiometer associated with the trigger step, which would not be possible if relays were employed.

The vehicle speed sensor is most advantageously an inductive rotational speed generator having its impulse frequency converted into a linear control voltage in an impulse converter, which is quite small and compact so that it may be placed at any suitable point in the axle drive. It is particularly advantageous to provide the inductive rotational speed generator closely adjacent to one of the rotating shafts of the drive axle gear arrangement, particularly the differential bevel gear so that particularly favorable and reliable impulse signals may be obtained. The load sensor for the output of the internal combustion engine may be simple potentiometer operatively connected with the gas pedal so as to have a position correlated with the position of the carburetor throttle valve. The control voltages that are supplied by the inductive rotational speed generator and the potentiometer are integrated in a transistor circuit, are fed through a direct current amplifier and supplied as the input voltage for the trigger steps. By this operatively reliable means, an integrated control voltage correlated to both vehicle speed and engine output for each of the gear shift steps is immediately provided, that is without delay. The device is further simplified in that the trigger steps for the initiation of the automatic shifting consist of operatively similarly constructed parts having voltage dividers providing the motor control voltage. A common manually operated switch for interrupting the current supply to the trigger steps is provided so that the gear shifting may be operated manually and independently of the speed sensor and load sensor by means of a mechanical follower for the servomotor.

Further features, advantages and objects of the present invention will become more clear from the following detailed description of a preferred embodiment of the present invention.

Brief description of the drawing

FIGURE 1 is a schematical shifting diagram for the three gear change speed arrangement for a motor vehicle according to the present invention; and FIGURE 2 shows a table and correlated shifting diagram according to which the shifting arrangement of FIGURE 1 operates.

Detailed description of the drawing

As schematically shown in FIGURE 1, the transmission 1 may be of conventional construction with three forward gears and a reverse gear. The transmission is provided with an output axle drive shaft 2 for the differential. A vehicle speed sensor, that is inductive rotational speed generator, 3 is operatively associated with the bevel gear 4 of the differential that engages the bevel gear 2 for driving the wheels of the vehicle. The signal from the speed sensor is applied to a pre-amplifier T1 and a limiter T2, which are per se conventional transistor circuits. An impulse former transistor circuit T3 is serially connected with the transistor circuits T1 and T2 for converting the speed sensor impulses into a control voltage.

An engine load sensor includes a potentiometer 5, having a suitable power source (not shown), operatively mechanically connected with the gas pedal 6 of the internal combustion engine 7 and electrically connected to provide a signal to the impulse former transistor circuit T3. The position of the potentiometer 5 is therefore proportional to the position of the carburetor throttle valve 8.

The speed sensor output control signal and the load sensor output control signal are integrated in a transistor circuit T4 that is serially connected with and combined with the transistor circuit T3. A direct current amplifier T5 is connected to the outlet of the combined transistor circuit T3, T4. The transistor circuits T1–T5 consist of known elements with resistance and condenser groups sized according to the output voltage. Trigger steps A and B are parallel connected to the direct current amplifier T5 and are of similar construction with each having a trimming potentiometer 9 for setting the spread between the trigger voltage for up-shifting and the trigger voltage for down-shifting, respectively. The trigger steps A and B respond to different control voltages for respectively different gear shifts because of the correspondently different sized series resistances 10 and 11, respectively. A fine adjustment of the input trigger voltage is obtained with the potentiometers 12 and 13, respectively, that are in circuit ahead of each trigger step.

The transistor groups 14 and 15 of the trigger steps A, B, respectively, are electrically connected to the vehicle battery 16 the same as the unillustrated electrical connection of the transistor circuits T1–T5. In order to avoid voltage fluctuations produced by the battery 16 in the electrical system 17, 18, the electrical connection is accomplished through a known type of transformer 19 that is equipped with transistors; at the same time, this provides a stabilization of the voltage to one value that is considerably lower than the battery voltage. As a specific example, a 12 volt battery may be used and the voltage supply to the transistor circuits T1–T5 and to the trigger steps A, B is stabilized at 7 volts. A manually operated switch K1 is serially connected in the line 17 ahead of the trigger steps A, B. The power line 18 is provided with a contact bridge having contacts K2, K3, K4 and K5. A voltage divider 20 is connected between the lines 17 and 18, and provided with a resistance ratio corresponding to the shifting position of the reverse gear. Between the resistances 21 and 22 of the voltage divider 20, a line 23 branches off for connection with the transistor circuit T6 of a follower device for the reversible motor 24. The control voltages for the reversible motor 24 are obtained by the various resistances 25–28 to rotate the motor and produce a translation shifting movement by means of the gear 29. A feedback circuit, schematically illustrated, provides a feedback voltage correlated to the movement of the motor for neutralizing the control voltage produced by the resistance bank 25–28 after the motor has travelled the required distance. The resistance group 25–28 is arranged between the contact bridge K2–K5, respectively, and line 23. Resistance 25 serves for shifting to first gear, I; resistance 26 provides for shifting to second gear, II; resistance 27 provides for shifting to third gear, III; resistance 28 provides for shifting to the neutral position N. For the automatic shifting operation, the trigger step A output is connected through line 30 between the resistance 26 and the contact K3 of the second gear, and the output of the trigger step B is connected through line 31 between resistance 27 and contact K4 of the third gear. The field current for the reversible motor 24 is provided at 5 volts stabilized by the transformer 19 through the power lines 32, 33 and 34.

For automatic shifting, the manual control lever 35 is moved from the neutral position indicated in the drawing (FIGURE 2) into the position A which closes contacts K1 and K2, while opening contact K5 with respect to the positions illustrated in FIGURE 1. In this manner, the resistance ratio in the voltage divider for the motor 24 is changed between the resistances 28 and 25 so that an effective voltage is impressed upon the motor 24 for operation thereof until the effective voltage reaches approximately zero due to the effect of the feedback circuit (FIGURE 1), at which position the motor will have changed the gear ratio to that of first gear. Simultaneously with the closing of switch K1, the trigger steps A, B and the transistor circuits T1–T5 are charged and supplied with current.

If the motor is thereafter accelerated by means of the gas pedal 6, a control voltage is built up by the speed sensor T3 through sensing the rotational speed of the gear 4. This control voltage is integrated in the transistor circuit T4 with the output control voltage of the load sensor including the potentiometer 5, so that the integrated control voltage is amplified by the amplifier T5. By this means, a highly advantageous control signal is produced that is correlated to the vehicle speed and engine load. As a specific example, when this voltage reaches a value of 1.5 volts, the transistor circuit of the trigger step A responds and provides a voltage break-through from line 18, fed by the battery 16, to line 30 for providing current to the input side of the resistance 26. The voltage divider now includes the combined resistance of resistances 25 and 26 so that the motor 24 is again provided with a control voltage to further provide a translation mechanical output from the gear arrangement 29 to shift the transmission into second gear.

The above process repeats itself when a larger control voltage is provided by the transistor circuits fed by the speed sensor and load sensor with a higher rotational speed of gear 4 and corresponding position of the engine throttle valve, for example. As a specific illustration, this higher voltage may be 4 volts to fire the trigger step B and provide current from line 31 to resistance 27 so that the voltage divider now includes the combined resistance of resistances 25, 26 and 27. The resulting control voltage is impressed upon the motor 24 to provide a shifting of the transmission to third gear.

Logically, the down-shifting is accomplished in the reverse sequence with the exception that the down-shifting trigger voltages of the trigger steps A and B will be slightly different from the up-shifting trigger voltages as adjusted by the trimming potentiometers 9 to avoid hunting.

Overriding manual shifting may be provided when the selector lever 35 is brought into the position I (FIGURE 2), which opens the switch K1 to disconnect the power to the trigger steps A, B. With the selector lever in position I, the contact K2 is closed so that the motor 24 drives the gear 29 into the first gear position. Similarly, switches K3 and K4 are closed when the selector lever 35 is moved into the positions II and II, respectively, to correspondingly adjust the position of the control gear 29. The control gear 29 may either directly or indirectly perform the shifting of the individual gear steps, by known means. Also, the selector lever 35 may be directly connected with the transmission to directly change the gear speeds and connected with the follower unit 29 by means of a lost motion connection so that the manual overriding shifting is completely independent of any electrical circuits. The shifting arrangement is applicable to a shifting device wherein the electronic portion operates a hydraulic control circuit that shifts the gears.

A preferred embodiment of the present invention has been described in detail for purposes of illustration and to set forth some of the more narrow aspects of the present invention; further modifications, variations and embodiments are contemplated.

We claim:
1. A change speed transmission for vehicles, particularly motor vehicles, comprising: an internal combustion engine; a gear transmission having electrically actuated means for changing gear ratios; automatic control means including an electric signal generating engine load sensor; an electric signal generating vehicle speed sensor; circuit means for integrating the vehicle speed sensor signal and the engine load sensor signal for producing an integrated control signal; a plurality of trigger circuit means connected with said integration means, each of which will fire to pass a current at a preselected fixed different signal corresponding to desired gear changes, respectively; additional circuit means for electrically connecting the output of said trigger means with said electrically actuated means; and manually operable means for changing gear ratios independently of at least said sensors and including switch means selectively rendering said trigger circuit means ineffective to operate said electrically actuated means.

2. The device of claim 1, wherein said additional circuit means includes a plurality of resistors connected parallel with respect to each other and serially connected with respective switches, said switches being in circuit for operating said electrically actuated means independently of said sensors; each of said trigger means being connected with a different one of said resistances for bypassing the corresponding switch.

3. The device of claim 2, wherein said vehicle speed sensor includes an inductive rotational speed generator having a frequency impulse output and said first mentioned circuit means includes impulse former means for converting the frequency impulses of said vehicle speed sensor into a linear control voltage.

4. The device of claim 3, wherein said vehicle includes a differential gear arrangement having a plurality of individual gear elements; said inductive rotational speed generator being operatively associated with one of said gear elements.

5. The device of claim 3, wherein said circuit means include a transistorized integration circuit means for combining the signals from said vehicle speed sensor and said engine load sensor to produce a single integrated control signal output, and a direct current amplifier receiving said integration means output and having its output connected to said trigger means.

6. The device of claim 2, said vehicle including a carburetor having a throttle valve; wherein said vehicle includes an accelerator gas pedal; said engine load sensor includes a potentiometer mounted for adjustment by movement of said gas pedal for producing a signal output correlated to the position of the carburetor throttle valve.

7. The device of claim 6, wherein said circuit means include a transistorized integration circuit means for combining the signals from said vehicle speed sensor and said engine load sensor to produce a single integrated control signal output, and a direct current amplifier receiving said integration means output and having its output connected to said trigger means.

8. The device of claim 2, wherein said trigger means consist of structurally identical elements operatively connected in an identical manner and different voltage divider means for determining the firing voltage of the respective trigger means.

References Cited

UNITED STATES PATENTS

| | | | |
|---|---|---|---|
| 2,891,411 | 6/1959 | Sutherland et al. | 74—866 X |
| 3,019,666 | 2/1962 | Brennan et al. | 74—866 |

A. HARRY LEVY, Primary Examiner

U.S. Cl. X.R.

180—70, 77, 105